United States Patent [19]
Gilboa et al.

[11] Patent Number: 5,341,242
[45] Date of Patent: Aug. 23, 1994

[54] HELMET MOUNTED DISPLAY

[75] Inventors: Pinhas Gilboa; Alexander Gold; Joseph Yaeli, all of Haifa, Israel

[73] Assignee: Elbit Ltd., Haifa, Israel

[21] Appl. No.: 878,391

[22] Filed: May 4, 1992

[30] Foreign Application Priority Data

Sep. 5, 1991 [IL] Israel ......................................... 99420

[51] Int. Cl.$^5$ ...................... G02B 17/08; G02B 27/10; G02B 5/10
[52] U.S. Cl. .................... 359/631; 359/633; 359/637; 359/858; 359/365
[58] Field of Search ............... 359/631, 630, 633, 637, 359/720, 858, 869, 365, 13, 14

[56] References Cited

U.S. PATENT DOCUMENTS

| | | |
|---|---|---|
| 3,302,515 | 2/1967 | Knus . |
| 3,787,109 | 1/1974 | Vizenor . |
| 3,923,370 | 12/1975 | Mostrom . |
| 4,026,641 | 5/1977 | Bosserman et al. . |
| 4,081,209 | 3/1978 | Heller et al. . |
| 4,364,636 | 12/1982 | Ellis . |
| 4,722,601 | 2/1988 | McFarlane . |
| 4,761,056 | 8/1988 | Evans et al. . |
| 4,859,030 | 8/1909 | Rotier ................................. 359/631 |
| 4,878,046 | 10/1989 | Smith . |

FOREIGN PATENT DOCUMENTS

| | | |
|---|---|---|
| 0303742 | 2/1989 | European Pat. Off. . |
| 2730635 | 1/1979 | Fed. Rep. of Germany . |
| 2569863 | 3/1986 | France . |
| 1489323 | 10/1977 | United Kingdom . |

OTHER PUBLICATIONS

J. G. Droessler et al, "Tilted Cat Helmet–Mounted Display", Optical Engineering, vol. 29, No. 8, Aug. 1990, Bellingham US pp. 849–854.

*Primary Examiner*—Jon W. Henry
*Attorney, Agent, or Firm*—Cushman, Darby & Cushman

[57] ABSTRACT

A display, for example, for a visor attached to a helmet, the visor having a partially reflecting semi-transparent portion in the view of the wearer and an optical projector for projecting an image onto the semi-transparent portion for reflection therefrom. The semi-transparent portion has a relatively higher reflectivity in a central area thereof and a relatively lower reflectivity in an annular area outside the central area. In one aspect of the invention, the head mounted display includes a projector having a display source whereon an image is formed and an optical system for focusing the image at separate sagittal and tangential foci between the image-forming surface and the semi-transparent portion.

22 Claims, 5 Drawing Sheets

HELMET MOUNTED DISPLAY

FIELD OF THE INVENTION

This invention relates to the field of displays and especially to the field of head mounted helmet displays.

BACKGROUND OF THE INVENTION

Helmet displays which allow for the simultaneous viewing of information and/or images generated by a computer or other source together with and/or superimposed on a direct viewing of a distant scene are well known.

One type of such apparatus provides a small, flat, usually partially reflecting, mirror which projects an image from a CRT toward the eye of a viewer. Examples of such apparatus are described in U.S. Pat. No. 4,364,636 to Ellis and U.S. Pat. No. 4,722,601 to McFarlane. U.S. Pat. No. 4,026,641 describes a system in which the CRT display is projected at an oblique angle onto a toric display reflector which reflects the image toward the eye of the observer.

A second type of apparatus provides for the image to be projected off a semi-reflecting portion of the visor of the helmet. In general, if such reflection is made at an oblique angle off a spherical surface, the image, as viewed by the observer, is distorted. In order to at least partially relieve this problem, U.S. Pat. No. 4,761,056 to Evans et al. provides a parabolic semi-reflecting portion on the helmet visor and a parabolic mirror for reflecting the image onto the semi-reflecting portion. Similarly, U.S. Pat. No. 3,787,109 to Vizenor and U.S. Pat. No. 3,923,370 to Mosttom are typical of systems in which the image is reflected off a semi-reflecting parabolic portion of a visor to the eye of the observer.

U.S. Pat. No. 4,878,046 to Smith interposes a beam splitter mirror in the line of view of the observer, so that the reflection from the semi-transparent surface, be it spherical or planar, is not distorted.

U.S. Pat. No. 4,081,209 describes a system in which the image of a LED display is reflected from a spherical semi-reflecting surface molded into the surface of the helmet visor. A prism, placed in the path of the projection from the LED display to the spherical surface, is used to compensate for spherical and croma aberrations caused by the off-axis reflection from the spherical surface and an additional cylindrical element is added to compensate for astigmatic effects. In this system the image is projected toward the eye from the source without any intervening focus. Such systems appear to be unable to compensate for a field of view of more than a few degrees, even with the addition of additional elements. Apparently in order to allow for compensation by this method, the semi-reflecting section is separate from, and at an angle with, the rest of the visor.

None of the abovementioned apparatus deal with a further problem of such heads-up helmet mounted display systems, namely the effect of the edge of the semi-transparent surface, which appears to be present in all commercial systems. While the superimposition of data or other images on the directly viewed scene is well-received, the effect of the edge of the semi-reflecting region is annoying to most users. For most of the above systems this effect is unavoidable since there is a physical edge or sharp change in curvature at the edge of the semi-transparent region.

U.S. Pat. No. 3,302,515 describes a projection mirror where the reflectivity of the surface decreases from the edges to the center so as to provide a uniformly lighted field.

SUMMARY OF THE INVENTION

It is an object of one aspect of the present invention to supply an improved, relatively wide angle substantially non-distorting, head mounted projection system especially suited for a helmet utilizing a spherical semi-reflecting portion of the visor of the helmet.

It is an object of one aspect of the invention to provide an improved display especially a helmet mounted display using a semi-reflecting portion of the visor, wherein having substantially no discernible edge effect.

There is therefore provided, in a preferred embodiment of the invention, a display including a visor attached to the helmet and having a partially reflecting semi-transparent portion in the view of the wearer and an optical projector for projecting an image onto the semi-transparent portion for reflection therefrom, wherein the semi-transparent portion has a relatively higher reflectivity in a central area thereof and a relatively lower reflectivity in an annular area outside the central area.

In a preferred embodiment of the invention, the reflectivity of the annular area decreases as the distance from the central area increases.

Preferably the annular area intersects an angle of at least about 25, more preferably at least about 50, and most preferably at least about 100 mrad when viewed by the wearer.

There is further provided in a preferred embodiment of the invention a head mounted display preferably including a visor attached to a helmet and having at least a partially reflecting portion in the view of the wearer and an optical projector for projecting an image onto the at least partially reflecting portion for reflection therefrom. The optical projector includes a display source whereon an image is formed and an optical system for focusing the image at separate sagittal and tangential loci between the image forming surface and the at least partially reflecting portion.

In a preferred embodiment of the invention the optical projector includes a toroidal mirror. Preferably, the projector includes a focusing element placed between the sagittal and tangential loci. More preferably one face of the element is placed at the sagittal focus and the second face is placed at the tangential focus. Alternatively, the optical projector includes a focusing element placed at the tangential focus and/or a focusing element placed at the sagittal focus.

Preferably the at least partially reflecting portion has a substantially spherical shape, the image is reflected therefrom at an angle to the radius therefrom and the sagittal and tangential foci of spherical surface correspond to the sagittal and tangential foci of the image.

In a further preferred embodiment of the invention, there is provided a helmet mounted display including a visor attached to the helmet and having a substantially spherical, at least partially reflecting portion in the view of the wearer and an optical projector for projecting an image onto the at least partially reflecting portion. The optical projector includes a display source whereon an image is formed and a toroidal mirror for reflecting the image received from the image forming surface.

In yet a further preferred embodiment of the invention there is provided a helmet mounted display including a visor attached to the helmet and having a partially reflecting at least partially reflecting portion in the view of the wearer and an optical projector for projecting an image onto the at least partially reflecting portion. The projector includes a display source whereon an image is formed, a toroidal mirror for reflecting the image from the image source, an imaging lens system, preferably an astigmatic lens system for receiving the image from the toroidal mirror, and a prismatic lens for receiving the image from the astigmatic lens for projection onto the at least partially reflecting surface.

There is further provided, in a preferred embodiment of the invention, a helmet including a helmet mounted display of the invention.

While the display apparatus of the invention is especially suitable for a head-up helmet display it is also applicable to goggles or other substantially transparent head mounted windows having images projected thereon.

BRIEF DESCRIPTION OF THE DRAWINGS

These and other objects, features and advantages of the invention will become more apparent in view of the detailed description of a preferred embodiment of the invention as illustrated by the accompanying drawings in which.

DETAILED DESCRIPTION OF THE PREFERRED EMBODIMENT

Figure 1:
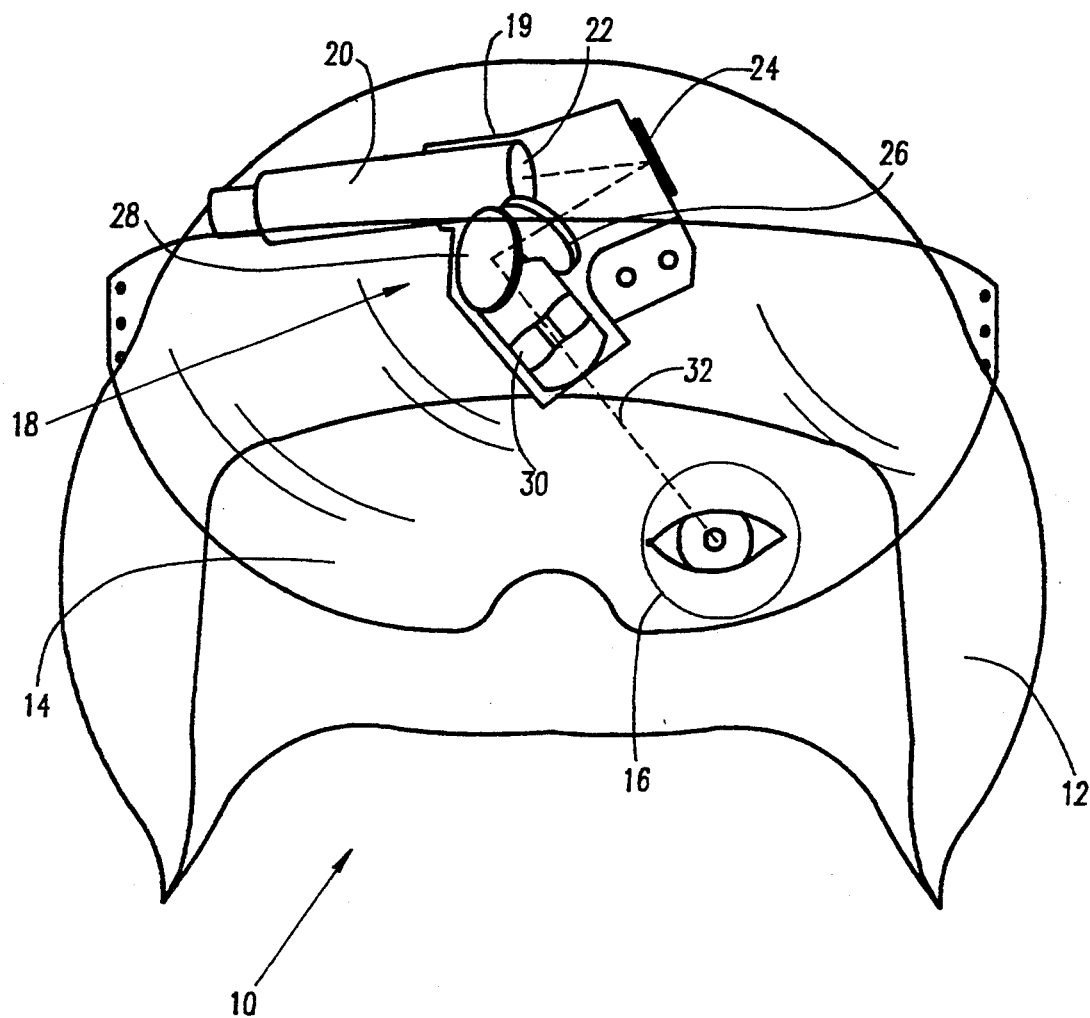
FIGS. 1 and 2 are respective front and side views of a helmet incorporating a helmet mounted display in accordance with a preferred embodiment of the invention.
Figure 2:
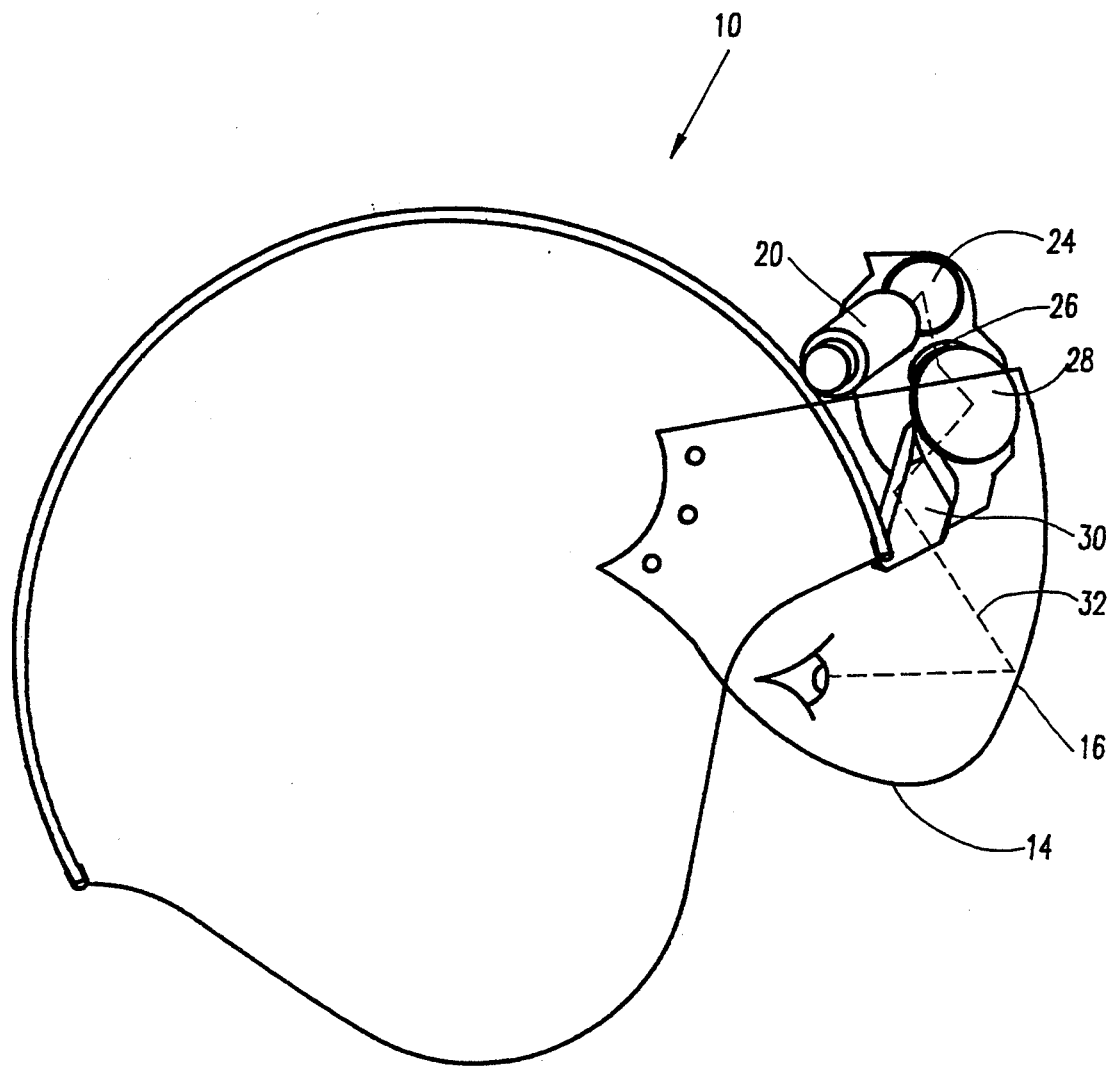

FIGS. 1 and 2 show respective front and side views of a helmet 10 in accordance with a preferred embodiment of the invention. Helmet 10 comprises a body portion 12 of standard construction and a mostly transparent visor 14 rotationally attached to the sides of body portion 12 such that it can be rotated upwards and out of view of the wearers. Visor 14 has, preferably, a substantially spherical shape and includes a partially-reflecting simi-transparent spherical portion 16, which will be described in more detail below, placed in the line of sight of the observer.

Mounted in a housing 19 above the visor is a projection system 18 for projecting information onto the semi-transparent portion 16 to form a helmet mounted display enabling the wearer to view the projection from system 18 superimposed on the outside scene. Projection system 18 includes a display 20 having a substantially flat display source 22. Display 20 can be for example a CRT display, a LED display, a plasma display, an electroluminescent display, a liquid crystal display or any other suitable display. Light from an image which is generated or formed at display source 22 is reflected from a toroidal folding mirror 24, which may be either a front surface mirror or a reflection coating placed on the back surface of a suitable lens, via a lens 26 to a folding mirror 28. The image, after reflection from mirror 28, passes through a preferably prismatic lens 30 to semi-transparent portion 16 whence it is reflected toward the eye of the wearer of the helmet. The path of the central ray of the image is shown on FIGS. 1 and 2 by dotted line 32.

Figure 3:
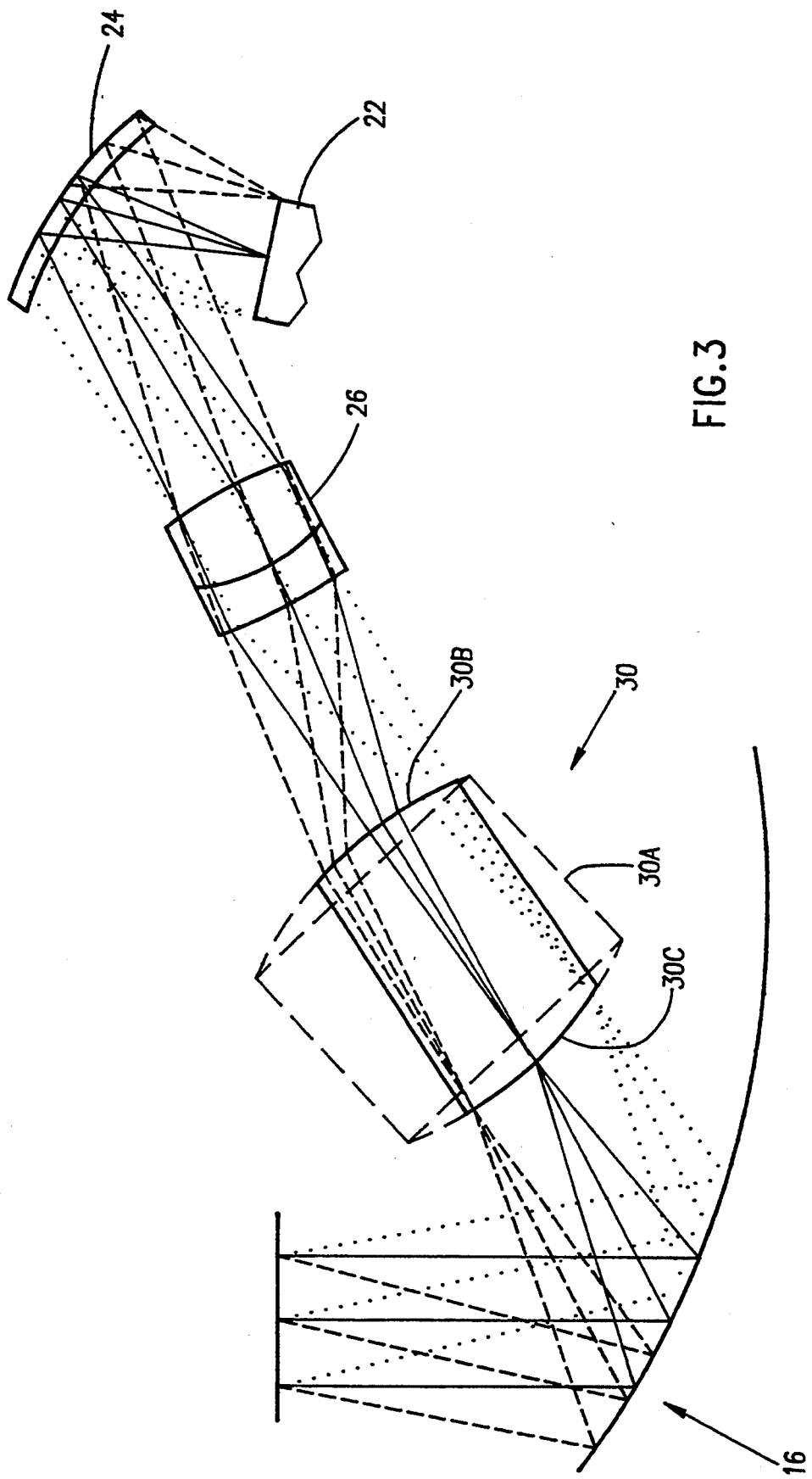
FIG. 3 is an unfolded drawing of the optical path of a display system of the preferred embodiment of FIGS. 1 and 2.

As is well known, images which are reflected off-axis from a spherical surface have both astigmatic and spherical aberrations. An unfolded drawing of the optical path of the projection system is shown in FIG. 3. Lens 30 comprises a central, preferably prismatic portion 30A and two spherical portions 30B and 30C. It should be noted that, in a preferred embodiment of the invention, one of the spherical portions is placed at or near the tangential focus of surface 16 and the other spherical portion is placed at or near the sagittal focus of surface 16. This placement allows for separate adjustment of the focal lengths of the two reflection axes. Lens 30 acts as field optics for the system and partially corrects for the astigmatism caused by off-axis reflection from surface 16.

Lens 26 is designed to correct for some of the aberrations of the system.

Finally, toroidal mirror 24 compensates for the astigmatic effect of the off-axis reflection from surface 16, i.e., it focuses the light from source 22 at the tangential and sagittal focuses of surface 16.

As is more clearly seen in FIG. 3, prismatic lens 30 and lens 26 are placed at an angle to the optical axis of the system in order to aid in correcting for comma and spherical aberrations.

The above described projection system provides an image of source 22 to the eye of the wearer which appears to be at infinity. In practice, it may be preferable to add a field flattener at source 22 in order to overcome any residual minor aberrations in the optics to insure that the entire image is at infinity. The field flattener may be, for example, a lens placed at the source 22 or it may be a curved fiber optic face plate which will provide the image on a curved rather than flat surface. Alternatively, source 22 may be curved rather than flat.

In a preferred embodiment of the invention, the semi-transparent portion is not uniformly reflecting. Preferably, the central area of the semi-transparent portion has the desired uniform reflection and the reflectivity is decreased from the central area to the edge of the semi-reflective portion so that the edge is not noticeable to the wearer. The present inventors have found that a decreasing portion having a angle (as viewed by the wearer) of 50 mrad is sufficient to cause the edge effect to disappear where portion 16 has a reflectivity of 10%. For higher reflectivities larger decreasing portions are required-for example, 100 mrad at 30% reflectivities. In general an angle of 50–300 mrad is preferred, with about 130 mrad being especially preferred. Useful improvement is often achieved with angles as low as 50 mrad.

Figure 4:
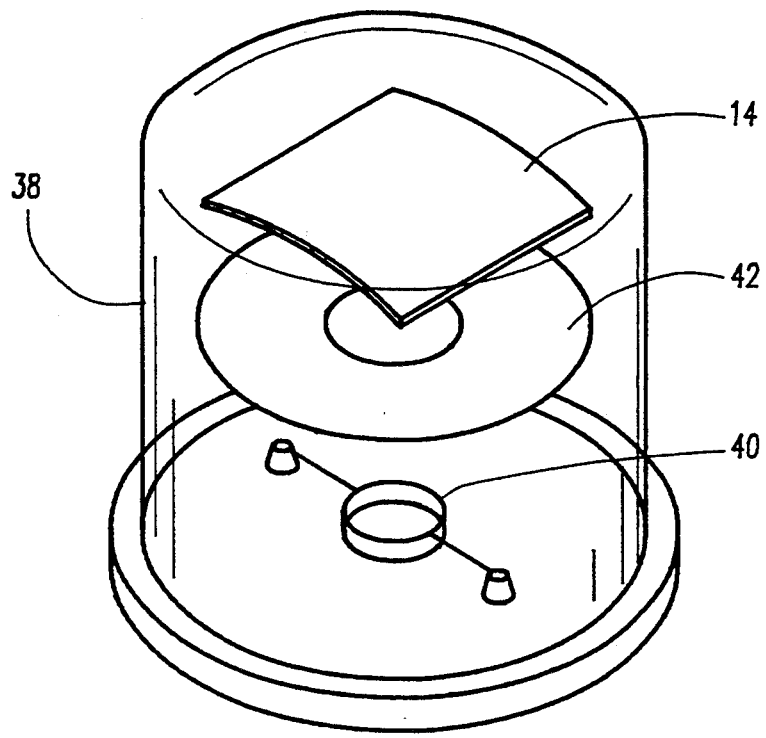
FIGS. 4 and 5 are schematic diagrams illustrating one method for producing a semi-reflecting surface according to a preferred embodiment of the invention.
Figure 5:
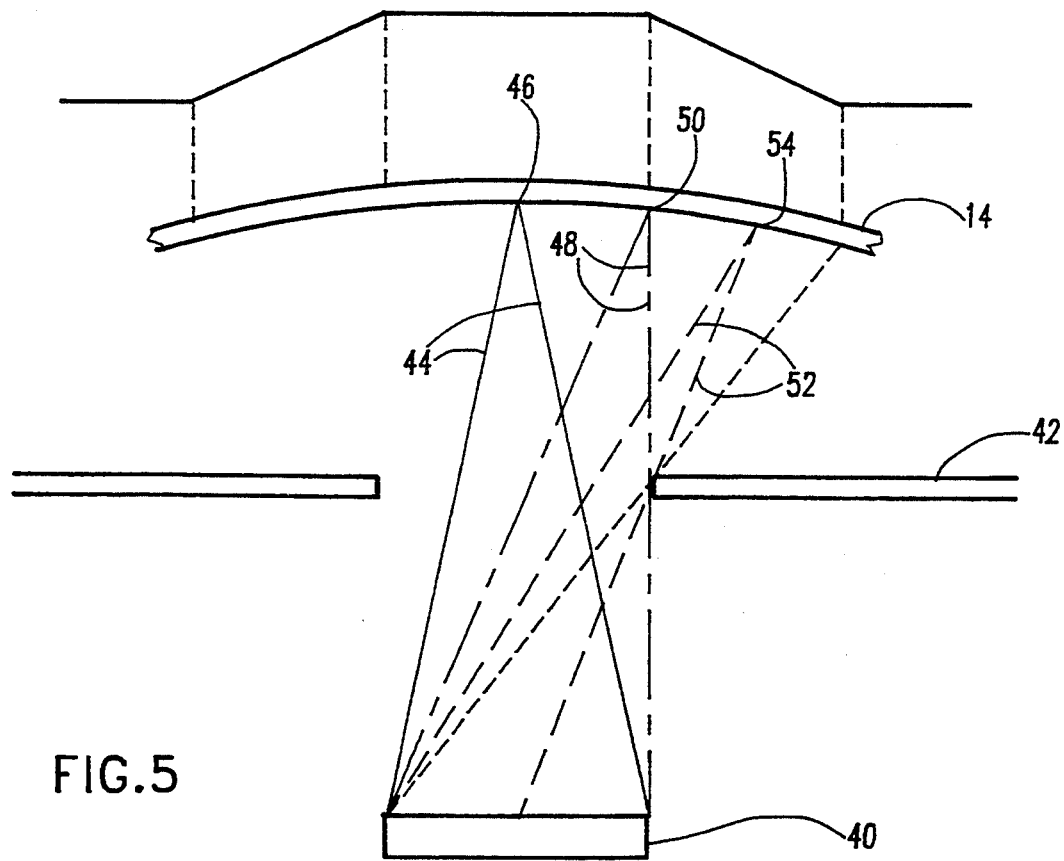

FIGS. 4 and 5 illustrate one method of producing a semi-reflecting coating having the desired edge. FIG. 4 shows a vacuum system including a vacuum bell 38 containing visor 14. Within the vacuum bell is a heated boat 40 containing the coating material for the semi-transparent portion 16. Spaced from and between boat 40 and visor 14 is a mask 42 having an opening of the generally the same shape as the semi-transparent portion.

The size of the opening and the spacing of mask relative to boat 40 and visor 14, as well as the size of the boat will be determined by simple geometric considerations as illustrated in FIG. 5 taking into consideration the size of central area and the desired angle of the decreasing portion. As shown in FIG. 5, portions of visor 14 adjacent to the center of the hole in mask 42 will be subject to evaporation from the entire boat 40, while outlying portions will "see" less of the boat, and will have a thinner layer deposited on them. Lines 44 indicate the portion of boat 40 (i.e., all of the boat) viewed by a point 46. Lines 48 indicate that off-center point 50 still sees the entire boat while lines 52 show that point 54 sees only a portion of the boat and is therefore coated by a thinner film of material. Thus, if a reflecting material is used to coat a portion of the surface of visor 14 with a thin film so that the central coated portion is semi-transparent, then near the edges the amount of coating will be reduced, reducing the reflectivity at the edges.

Figure 6:
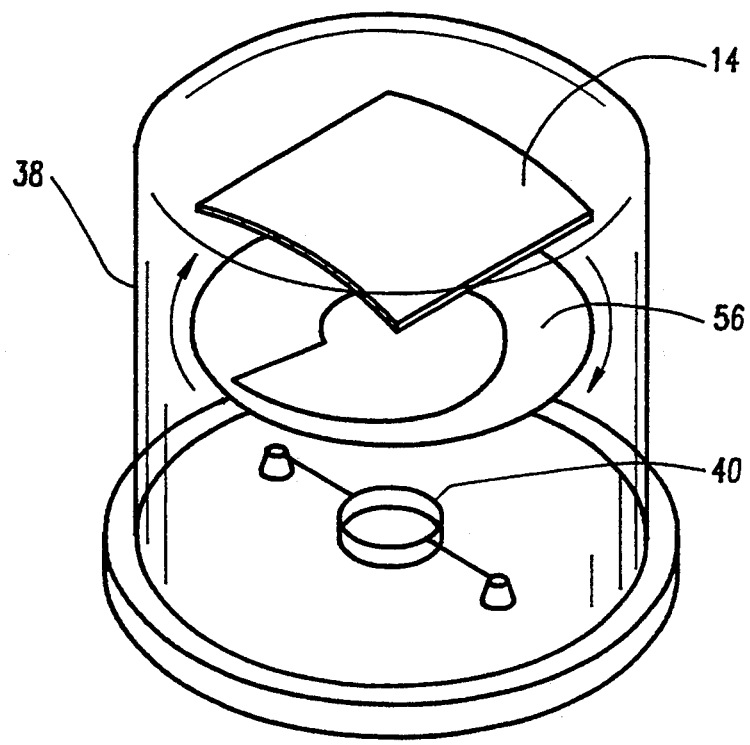
FIGS. 6 and 7 are schematic diagrams illustrating a alternative preferred method for producing a semi-reflecting surface according to a preferred embodiment of the invention.
Figure 7:
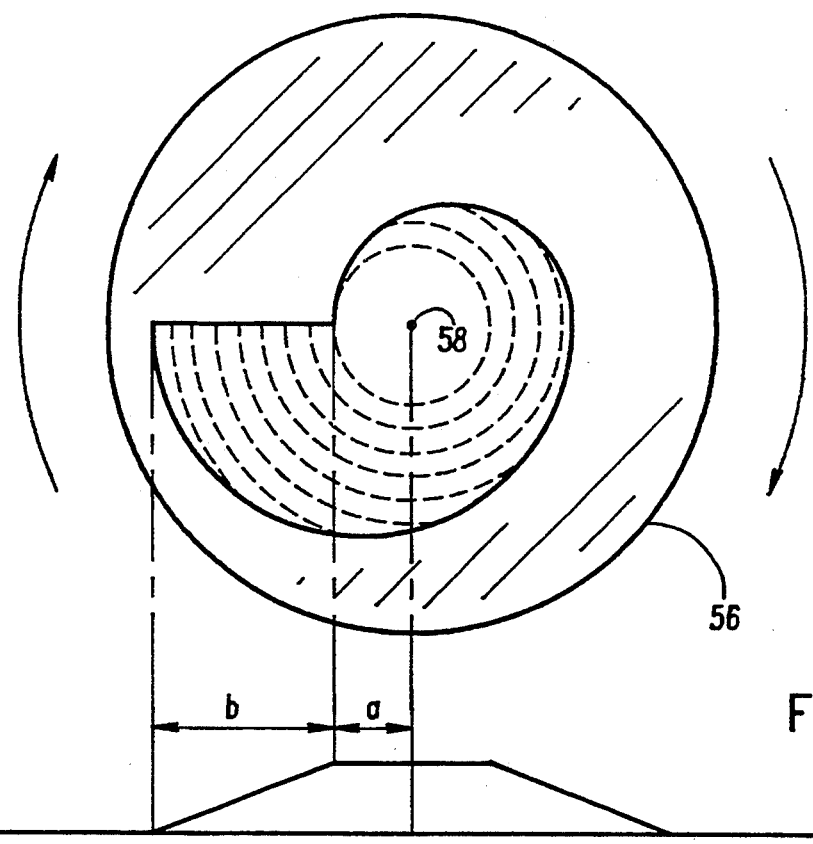

FIG. 6 shows an vacuum coating system similar to that of FIG. 4, except that the stationary mask is replaced by a rotating mask 56 closely spaced from visor 14. The aperture in mask 56, shown more clearly in FIG. 7 is not circularly symmetric and rotates about point 58. In this situation, the central portion, marked "a" on the curve at the bottom of FIG. 7 will be uniformly coated, while portions outside the central portion, marked "b" on the curve will have less coating the farther they are from the central portion, due to the decreased amount of time they view boat 40.

While the present invention has been described in conjunction with a helmet mounted display having a visor on which the projected images are displayed, the invention is also applicable to other types of viewers such as goggles and larger windows on which images are projected.

Although the present invention has been shown and described with respect to preferred embodiments thereof, it will be understood by those skilled in the art that various changes, additions and deletions in form and detail thereof can be made therein without departing from the spirit and scope of the invention, which is limited only by the claims.

We claim:

1. Head mounted display apparatus comprising:
   a surface mounted on an observer and having an at least partially reflecting portion in the view of the observer; and
   an optical projector for projecting an image for refection from the at least partially reflecting portion including:
      a display source whereon an image is formed; and
      an optical system for focusing the image at separate sagittal and tangential foci between the display source and the at least partially reflecting portion,
   wherein the at least partially reflecting portion has a substantially spherical shape, the image is reflected therefrom at an angle to the radius thereof and the sagittal and tangential foci of the spherical surface correspond, respectively, to the sagittal and tangential foci of the image.

2. Apparatus according to claim 1 wherein the optical system comprises a prismatic lens.

3. Apparatus according to claim 1 including a focusing element situated at the sagittal focus.

4. Apparatus according to claim 1 including a focusing element situated at the tangential focus.

5. Apparatus according to claim 1 and including at least one folding mirror in the optical path of the image to allow for a more compact projection system.

6. Apparatus according to claim 1 wherein said head mounted display does not include any intervening elements between an observing eye of the observer and the at least partially reflecting portion.

7. Apparatus according to claim 6 wherein the at least partially reflecting portion comprises a partially reflecting semi-transparent portion in the view of the observer and wherein the semi-transparent portion has a relatively higher reflectivity in a central area thereof and a relatively lower reflectivity in an annular area outside the central area.

8. Apparatus according to claim 6 wherein the surface is a visor attached to a helmet adapted to be worn by the observer.

9. Apparatus according to claim 6 wherein the optical system comprises a toroidal mirror operative to focus the image at said separate sagittal and tangential foci.

10. Apparatus according to claim 1 wherein the at least partially reflecting portion comprises a partially reflecting semi-transparent portion in the view of the observer and wherein the semi-transparent portion has a relatively higher reflectivity in an annular area outside the central area.

11. Apparatus according to claim 10 wherein the surface is a visor attached to a helmet adapted to be worn by the observer.

12. Apparatus according to claim 5 wherein the at least partially reflecting portion comprises a partially reflecting semi-transparent portion in the view of the observer and wherein the semi-transparent portion has a relatively higher reflectivity in a central area thereof and a relatively low reflectivity in an annular area outside the central area.

13. Head mounted display apparatus comprising:
   a surface mounted on an observer and having an at least partially reflecting portion in the view of the observer; and
   an optical projector for projecting an image for the reflection from the at least partially reflecting portion including:
      a display source whereon an image is formed; and
      an optical system for focusing the image on separate sagittal and tangential focal surfaces between the display source and the at least partially reflecting portion,
   wherein the sagittal and tangential focal surfaces of the focused image do not have a common point and wherein the at least partially reflecting portion has a spherical shape, the image is reflected therefrom at an angle to the radius thereof and the sagittal and tangential foci of the spherical surface substantially coincide, respectively, with the sagittal and tangential foci of the image.

14. Apparatus according to claim 13 wherein the at least partially reflecting portion comprises a partially reflecting semi-transparent portion in the view of the observer and wherein the semi-transparent portion has a relatively higher reflectivity in a central area thereof and a relatively lower reflectivity in an annular area outside the central area.

15. Apparatus according to claim 13 wherein the optical system comprises a toridal mirror operative to focus the image at said separate sagittal and tangential foci.

16. Apparatus according to claim 13 wherein the surface is a visor attached to a helmet adapted to be worn by the observer.

17. Apparatus according to claim 13 wherein said head mounted display does not include any intervening elements between an observing eye of the observer and the at least partially reflecting portion.

18. Apparatus according to claim 17 wherein the surface is a visor attached to a helmet adapted to be worn by the observer.

19. Apparatus according to claim 17 wherein the at least partially reflecting portion comprises a partially reflecting the semi-transparent portion has a relatively higher reflectivity in a central area thereof and a relatively lower reflectivity in an annular area outside the central area.

20. Apparatus according to claim 17 wherein the optical system comprises a toroidal mirror operative to focus the image at said separate sagittal and tangential foci.

21. Apparatus according to claim 1 wherein the surface is a visor attached to a helmet adapted to be worn by the observer.

22. Apparatus according to claim 1 wherein the optical system comprises a toroidal mirror operative to focus the image at said separate saggital and tangential foci.

* * * * *

UNITED STATES PATENT AND TRADEMARK OFFICE
CERTIFICATE OF CORRECTION

PATENT NO. : 5,341,242

DATED : August 23, 1994

INVENTOR(S) : GILBOA et al.

It is certified that error appears in the above-identified patent and that said Letters Patent is hereby corrected as shown below:

In Column 6, line 22, after "reflectivity in" insert

--a central area thereof and a relatively lower reflectivity in--;

In Column 7, claim 19, line 3, after "reflecting" insert

--semi-transparent portion in the view of the observer and wherein--.

Signed and Sealed this

Twenty-fifth Day of March, 1997

Attest:

BRUCE LEHMAN

*Attesting Officer*  *Commissioner of Patents and Trademarks*